United States Patent Office 3,047,909
Patented Aug. 7, 1962

3,047,909
PROCESS FOR TREATING ELASTIC FIBERS
Clarence Boyer, Swarthmore, Pa., assignor to E. I. du Pont de Nemours and Company, Wilmington, Del., a corporation of Delaware
No Drawing. Filed May 4, 1959, Ser. No. 810,583
12 Claims. (Cl. 18—48)

This invention relates to a heat treatment for shaped articles from elastomeric polymers. More particularly, it relates to a method for improving properties of fibers prepared from solutions of linear, segmented elastomers by a heat treatment.

Fibers having excellent elastic properties, toughness, abrasion resistance, and improved heat stability, oxidative stability, and stability on exposure to ultraviolet light, have been prepared by dry spinning synthetic, elastomeric copolymers. One class of copolymers is described in the copending application of Frankenburg & Frazer, Serial No. 556,071, now Patent No. 2,957, 852. Other segmented elastomeric copolymers are described in U.S. Patent 2,813,775 and U.S. Patent 2,813,776.

While synthetic elastic fibers may also be prepared from the aforementioned copolymers by wet-spinning processes, the wet-spun fibers have a relatively low tenacity and elastic properties which are lower than the comparable dry-spun fibers. Since wet spinning provides advantages such as the preparation of high denier fibers, high productivity per spinning position, low operating temperatures, and the utilization of large spinning orifices which minimizes plugging, a process for obtaining fibers having properties comparable to dry-spun fibers would be highly desirable.

It is an object of the present invention to provide a method for improving the tenacity, decay of stress, and tensile recovery properties of fibers prepared from linear, segmented elastomers. It is a further object of this invention to improve these properties without reducing the elongation or otherwise adversely affecting the fiber. Other objects will be apparent from the following detailed description of the invention.

These and other objects are achieved by heating shaped articles prepared from substantially linear, segmented elastomeric copolymers, having a molecular weight above 5000, at temperatures between 105° C. and 150° C. for a period of time of at least five minutes.

By "segmented elastomeric copolymers" is meant elastomeric copolymers comprised of two principal types of segments which are chemically connected and alternate in the polymer chain. One segment is derived from a crystalline, high-melting polymer, for example, a urea polymer, urethane polymer, amide polymer, bis-ureylene polymer, or polyester. The other segment, which is essentially amorphous, is derived from a low-melting, amorphous polymer, for example, an ester polymer, an ether polymer, a hydrocarbon polymer, polyamide, polyurea, polysulfonamide, or polyurethane.

In particular, the amorphous segments are derived from low-melting polymers having a melting point below 50° C. and a molecular weight above about 600. The other segments are derived from linear, crystalline polymers which have a melting point above about 200° C. in the fiber-forming molecular weight range, i.e., above about 5000. The latter segments comprise about 10% to about 40% of the weight of the segmented copolymers. These segments may be defined as comprising at least one repeating unit of the linear, crystalline polymer from which they are derived.

The preparation of segmented elastomeric polymers and shaped articles which may be treated according to the process of this invention is described in the aforementioned copending application Serial No. 556,071, now Patent No. 2,957,852, and U.S. Patents 2,813,775 and 2,813,776.

The polymeric structure of the shaped articles may be represented by the formula for the respective segments which repeat in the polymer chain, in which the amorphous segment has the formula

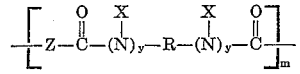

and the other segment has the formula

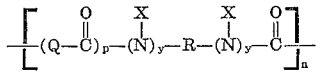

wherein Z is a bivalent organic radical which is inert to isocyanate groups at room temperature; R is a bivalent organic radical; Q is a bivalent chain-extending radical, preferably a member of the class consisting of hydrazo and organic diamino; $m$ and $n$ are integers greater than 0; $p$ and $y$ are integers from 0 to 1 with the provision that when one is 0 the other is 1; and X is a member of the class consisting of hydrogen and a monovalent organic radical. More particularly, Z is the residue resulting from the removal of all or part of each of the terminal functional groups of a polymer melting below 50° C., having a molecular weight above about 600, and containing terminal functional groups possessing active hydrogen. For example, when the terminal functional group is —COOH, the entire group would be removed. When it is —OH, the terminal hydrogen only would be removed. The terminal functional groups possessing active hydrogen may be, for example, —OH, —NH$_2$, —SH, —COOH, —CO—NH$_2$,

—CS—NH$_2$, —SO$_2$NH$_2$, and —SO$_2$OH. Bivalent radicals Q, R, and Z should be free of active hydrogen. Chain-extending radical Q may be derived from chain extenders such as, for example, hydrazine and substituted hydrazines, organic diamines, glycols, amino alcohols, and the like. Chain extension may also be effected by using water.

Although the segmented copolymers which are treated by the process of this invention are described as "substantially linear," it is not intended that segmented polymers which have some branches extending from the polymer chain be excluded.

In practicing this invention, a shaped article is prepared by a dry-, wet-, or chemical spinning process. The shaped article, while in either the relaxed or taut condition but substantially free of applied stretch, is heated to a temperature between 105° C. and 150° C. for at least five minutes. The temperature selected will depend on the duration of the treatment, on the particular copolymer that is being treated, on the method of spinning, and on the presence or absence of other chemical substances such as water, plasticizer, or solvent. Too high a temperature may lead to degradation of the fiber or development of color. A range of 110° to 130° C. is preferred. The time of treatment will depend on the temperature, on those variables listed above which affect the choice of temperature, and on the thickness of the elastic article. For example, fine denier filaments usually require a shorter period of treatment to achieve comparable property improvement than do thicker filaments. A time less than ten hours is usually preferred. However, periods up to seventy hours may be used provided the temperature is controlled within the limits previously specified to prevent degradation and objectionable color formation.

The heat may be supplied in any suitable form, such as hot gas or liquid, infrared radiation, ultrasonic energy, dielectric heating, or other, so long as it is controllable and does not carry the temperature beyond the desired range. If an oven is used, it is sometimes advantageous to heat under vacuum or under an inert gas in order to prevent oxidative damage to the fibers. If a bath is used, a bath liquid must be chosen which will not cause sticking of the fibers, and which is easily removed after the treatment by evaporation or washing. The heating can be carried out on yarn which is in skeins, on bobbins, pirns, cones, or other packages.

The process of the invention may be carried out on various forms of fibers. For example, continuous filament tow may be heat-treated, or the tow may be first cut into staple, which may be heat-treated either in bulk or after the staple is spun into yarn.

The fibers to which the present invention is applicable are wet-spun or dry spun from solutions of the elastomeric copolymers. These solutions may be prepared, for example, by carrying out the final step of the polymerization in the presence of solvent.

In the preparation of a preferred segmented elastomer which is described in the aforementioned copending application Serial No. 556,071, now Patent No. 2,957,852, a prepolymer is first prepared in a "capping" reaction, wherein a polyether glycol is equipped with isocyanate ends by reaction with a diisocyanate in a molar ratio of 1 to 2. In some cases, the polyether glycol is first "coupled" by reaction with diisocyanate in a molar ratio of 2 to 1 or 3 to 2 in order to form a dimer:

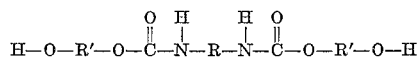

or a "trimer":

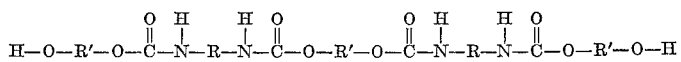

where —OR'—O represents a divalent polyether radical and —R— represents a divalent organic radical. The dimer or trimer is then capped with diisocyanate in a subsequent step. The "coupled" prepolymer has a lower melting point than a monomeric prepolymer of the same molecular weight, and for this reason leads to superior elastomers.

In the final step, called the "chain extension" step, prepolymer of molecular weight between 700 and 5000 is reacted with an equimolar quantity of hydrazine according to the relation

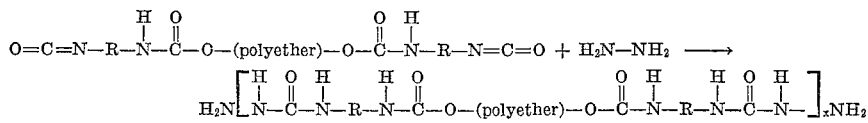

where —R— represents a divalent organic radical, —(polyether)— represents a divalent organic radical comprising a polyether, and $x$ represents the number of repeating units in the extended chain. Instead of being terminated with —NH$_2$ groups (or —N=C=O groups), the chain may be terminated with other groups such as R$_2$N— if "chain stoppers" such as R$_2$NH or ROH are present during the reaction. In carrying out the reaction the prepolymer is dissolved in the chosen solvent, and to the resultant solution is added the chain extension agent, hydrazine, in the form of a dilute solution of hydrazine hydrate.

The foregoing reactions have been described in terms of the preferred elastomer, namely a diisocyanate-modified polyether extended with hydrazine. Other elastomers to which the process is applicable include, for example, those in which a diamine, an aminoalcohol or a glycol is substituted for hydrazine as the chain extending agent, or those in which a polyester is substituted for a polyether as the soft segment or those in which both substitutions have been made simultaneously. The process is applicable to any linear, segmented elastomer whose soft segment has been modified with polyisocyanate.

The preparation of other segmented elastomeric fibers which may be treated according to the process of this invention may be similarly achieved by chain extension of a bifunctional, low molecular weight polymeric intermediate which provides the amorphous segments. In general, fibers prepared from any substantially linear, segmented elastomeric copolymer consisting of first and second segments in which said first segment contains the residue after removal of terminal active hydrogens from a linear polymer melting below 50° C., having a molecular weight above 600, and containing terminal radicals possessing active hydrogen, and said second segment is at least one repeating unit of a linear, crystalline polymer having a melting point above about 200° C. in its fiber-forming molecular weight range, may be treated according to the process of this invention.

Suitable solvents which may be used in the preparation of the elastic fibers are water-miscible compounds with 2 to 6 carbon atoms and a dipole moment greater than 3.5 which have no active hydrogen atoms but have donor oxygen atoms for hydrogen bonding; for example, dimethyl formamide, dimethyl acetamide, dimethyl propionamide, methoxy dimethyl acetamide, hexamethyl phosphoramide, dimethyl nitrosamine, N-methyl pyrrolidone, and N-acetyl morpholine.

The wet spinning process is carried out in a conventional manner. It is preferable that the concentration of polymer in solution be between 5% and 30%, although solutions of less than 5% can be spun, and the only limiting factor on the upper level of the concentration is the stability of the polymer solution to gel formation or precipitation. When spinning monofilaments of the heavier deniers, it is desirable that the solution to be spun comprise a minor proportion of a water-insoluble substance which swells the polymer and is soluble in the solvent, as described in the copending application of Richard N. Blomberg, Serial No. 725,866, filed April 2, 1958, now Patent No. 2,965,437. For the finer deniers, such as required for staple, the use of said water-insoluble substance may be dispensed with.

The coagulation bath is generally water, or a mixture of water and solvent, but other solvent-miscible liquids are feasible.

A coagulation bath temperature somewhat less than 100° C. is normally suitable for the spinning operation, although in those cases where a low boiling additive such as methylene chloride is used, the temperature of the coagulation bath should be less than the boiling point of this additive in order to avoid vaporization of the modifier inside the fiber with consequent weakening of the structure by formation of voids.

The length of travel of the threadline in the bath will depend upon the rate of extrusion and rate of windup, the temperature of the coagulation bath, and the concentration of the polymer dope. During the spinning process the threadline is stretched only to the extent made unavoidable by viscous drag. At windup speeds of 15 yards per minute the bath travel will normally be about 65 feet for a 300 denier yarn. The extraction of solvent must be sufficiently complete to give a non-sticky yarn at the time the filament emerges from the coagulation bath. The yarn may be further washed in order to effect complete removal of the solvent.

The process of this invention will be further illustrated by the following examples, which are merely illustrative and are not intended to limit the invention in any way since polymers falling within the above description may replace those given in the examples with comparable results.

In the examples, "tenacity," given in units of grams per denier, is the breaking strength based on the relaxed cross section. The "elongation" is the increase in length to break expressed in percent of the original length. "Tensile recovery" is the percentage return to the original length within one minute after the tension has been released from a sample which has been elongated 100% at the rate of 100% per minute and held at 100% elongation for 1000 minutes. "Stress decay" is the percent loss of stress in a yarn 1000 minutes after it has been elongated to 100% at the rate of 100% per minute. $\overline{M}_{50}$ is stress/strain at 50% elongation. The inherent viscosity "$\eta_{inh}$" is measured in a capillary viscometer at 30° C. at a concentration $c.=0.5$ (gm./100 ml.) in hexamethyl phosphoramide. It is calculated from the relation:

$$\eta_{inh} = \frac{\ln \eta_{rel}}{c}$$

where $\eta_{rel}$ is the flow time for the solution divided by the flow time for the solvent.

*Example I*

3000 parts by weight of poly(tetramethylene oxide) glycol of hydroxyl number 111.5 (molecular weight 1005) are reacted with 234 parts of 2,4-tolylene diisocyanate (molar ratio 2/1) for 3 hours on a steam bath in an inert, dry atmosphere with agitation. Without removing from the steam bath, 740 parts of methylene bis (4-phenyl isocyanate) are added, and stirring is continued for an additional hour. To the diisocyanate-modified product is added a solution containing 73 parts of hydrazine hydrate in 16,700 parts dimethyl formamide. The polymer solution has a concentration of 18.5%.

The solution is extruded through a .020 inch orifice into a water bath maintained at 70° C. The fiber is in contact with the water bath for one minute and is wound up at 15 yards per minute.

A bobbin of the fiber is placed in an oven at a temperature of 120° C. Samples of the yarn are removed from the bobbin periodically, and the physical properties are taken on the yarn samples. The yarn properties are summarized in Table 1.

TABLE 1

| Time, hrs. | Ten., g.p.d. | El., percent | $\overline{M}_{50}$, g.p.d. | Den. | S.D., percent 100/1,000/1 | T.R., percent 100/1,000/1 | $\eta_{inh}$ |
|---|---|---|---|---|---|---|---|
| None | 0.21 | 513 | 0.04 | 353 | 35 | 87 | 1.0 |
| ¼ | .22 | 453 | .05 | 330 | 37 | 87 | 0.86 |
| ½ | .25 | 477 | .06 | 300 | 35 | 91 | 0.86 |
| 1 | .31 | 522 | .05 | 270 | 31 | 91 | 0.81 |
| 2 | .35 | 571 | .06 | 253 | 30 | 91 | 0.90 |
| 4 | .48 | 604 | .07 | 285 | 29 | 91 | 0.88 |
| 8 | .58 | 657 | .06 | 283 | 29 | 91 | ------ |
| 28 | .77 | 609 | .06 | 300 | 28 | 95 | 1.27 |
| 70 | .77 | 548 | .07 | 263 | 27 | 96 | 1.40 |

*Example II*

Yarn is prepared according to the procedure of Example I. A bobbin of the yarn is placed in an oven at a temperature of 144° C. for varying lengths of time. Samples of the fiber are occasionally removed from the bobbin and subjected to physical testing. The physical properties of the samples are presented in Table 2.

TABLE 2

| Time, hrs. | Ten., g.p.d. | El., percent | $\overline{M}_{50}$, g.p.d. | Den. | S.D., percent 100/1,000/1 | T.R., percent 100/1,000/1 | $\eta_{inh}$ |
|---|---|---|---|---|---|---|---|
| 2 | 0.67 | 752 | 0.07 | 205 | 33 | 93 | ------ |
| 8 | .86 | 661 | .10 | 153 | 33 | 94 | 1.30 |
| 20 | .91 | 763 | .09 | 144 | 33 | 95 | 1.30 |
| 30 | .92 | 770 | .07 | 173 | 30 | 95 | 1.35 |

*Example III*

To the diisocyanate-modified product of Example I is added a solution containing 120 parts of ethylene diamine in 16,700 parts dimethyl formamide. The polymer solution has a concentration of 18.5%. The polymer solution is heated to a temperature of 110° C. and spun as a five-filament yarn into a 12-foot dry spinning column heated with air at 158° C. The time between heating and extrusion of the solution is held to less than two minutes. The yarn is talced upon emerging from the column and is wound up at 500 yards per minute. The as-spun yarn contains less than 5% of solvent. Properties before and after treatment are presented in Table 3.

TABLE 3

| Time, hrs. | Temp., ° C. | Ten., g.p.d. | El., percent | $\overline{M}_{50}$, g.p.d. | Den. | S.D., percent 100/1,000/1 | T.R., percent 100/1,000/1 | $\eta_{inh}$ |
|---|---|---|---|---|---|---|---|---|
| None | ------ | .8 | 673 | .05 | 63 | 31 | 95 | ---- |
| 15 | 105 | 1.1 | 702 | .07 | ---- | ------ | ------ | ---- |

*Example IV*

Yarn prepared as in Example I is rewound on a skein and is placed in an oven at 107° C. for 24 hours. The properties of the yarn before and after heat treatment are presented in Table 4.

TABLE 4

| Time, hrs. | Temp. ° C. | Ten., g.p.d. | El., percent | $\overline{M}_{50}$, g.p.d. | Den. |
|---|---|---|---|---|---|
| None | ----- | .31 | 555 | .05 | 288 |
| 24 | 107 | .58 | 533 | .06 | 323 |

*Example V*

To the polymer solution of Example I are added a slurry of titanium dioxide in dimethylformamide and a solution of poly(N-N-diethyl-beta-aminoethyl methacrylate) in dimethylformamide, such that the final mixture contains 5% of each additive, based on the elastomeric solids. The mixture is extruded through a 720-hole spinneret (orifice size 0.0015 inch) into an aqueous bath containing 50% dimethylformamide and maintained at about 95° C. The 2300 denier tow thus formed is removed at about 40–50 yards per minute and passed through a water bath maintained at 90°–95° C. until the filaments contain less than 0.5% dimethylformamide. After application of a talc finish, several yards of the tow are cut, and dried thoroughly at room temperature.

A slack portion of this tow is placed in an oven at a temperature of 110° C. Samples are removed periodically, and the physical properties observed on individual filaments are summarized in Table 5.

TABLE 5

| Time, hrs. | Ten., g.p.d. | El., percent | $\overline{M}_{50}$, g.p.d. | Den. |
|---|---|---|---|---|
| 0 | 0.39 | 528 | 0.07 | 3.5 |
| 0.5 | .50 | 543 | .06 | 3.3 |
| 1.5 | .60 | 556 | .06 | 3.9 |
| 6 | .65 | 586 | .06 | 3.3 |
| 24 | .48 | 603 | .05 | 3.6 |

*Example VI*

Other samples of the dried tow from Example V are similarly heated in an oven at a temperature of 130° C. The physical properties on individual filaments of the samples are presented in Table 6.

TABLE 6

| Time, hrs. | Ten., g.p.d. | El., percent | $\overline{M}_{50}$, g.p.d. | Den. |
|---|---|---|---|---|
| (¹) | 0.51 | 553 | 0.06 | 3.0 |
| .25 | .61 | 599 | .05 | 3.9 |
| .75 | .65 | 601 | .05 | 3.7 |
| 3 | .53 | 568 | .05 | 3.4 |
| 6 | .54 | 574 | .05 | 3.5 |
| 24 | .39 | 662 | .04 | 3.3 |

¹ 5 minutes.

It will be noted that the tenacity of the fibers in this and the preceding example rises to a maximum during the heat treatment and then declines under prolongation of the treatment. This is presumably due to the presence of the polyamine additive in the fiber, inasmuch as the fibers of Examples I and II show no such decline in tenacity.

*Example VII*

Other samples of the dried tow from Example V are heated in an oven at a temperature of 150° C. After five minutes of this treatment, the tenacity had increased to 0.60 g.p.d.

While the wet-spun fibers are benefited by the treatment of this invention to a more pronounced degree than the dry-spun fibers, the properties of both types of fibers are improved by the treatment. Without the process of the present invention the wet-spun fiber is completely unsuitable for use by the textile industry, with regard to both tenacity and elastic properties. In the case of the dry-spun fiber, the tenacity is raised from an acceptable value to a value at which its usefulness is greatly enhanced.

The process is clearly distinguishable from the usual heat treatments carried out on textile fibers, such as heat relaxing and heat setting, both as to its nature and as to its effect. Heat relaxing is carried out on drawn yarn, often by boiling the yarn as a skein, and is accomplished by a certain amount of shrinkage. This reduces its tendency to later relax on the package in a non-uniform manner, with consequent non-uniform dyeing. The present process is obviously distinct from heat relaxation in that it is carried out on an undrawn yarn, not necessarily as a skein, at temperatures higher than the boiling point of water.

Heat setting is ordinarily carried out on fabrics in order to assure their dimensional stability at the highest temperature at which they will be used. Heat setting in this sense has no meaning for an elastic fiber, whose usefulness depends upon its ability to reversibly change dimensions under light load. Furthermore, heat treatment of the fiber in a relaxed state in accordance with the present invention leads to property improvement, whereas ordinary heat setting is invariably carried out while the fabric is stretched under tension.

The origin of the beneficial effects derived from the present process is not well understood. Since the treatment is applicable to yarns in both the taut and the relaxed state, it appears that the explanation is chemical rather than physical. If a solution of the elastomer is heated, it rapidly loses viscosity. In fact, in the dry spinning of such a solution it is necessary to bring the temperature from 25° C. to about 120° C. and extrude the filament all within a period of about two minutes in order to keep the viscosity from falling to an unspinnable value. This behavior is strongly indicative of degradation of the elastomer. Consequently, it would be expected that the mechanical properties of the elastomer in fiber form should suffer during a prolonged heat treatment. Consequently it is most surprising that such a treatment actually raises the level of properties.

Fibers, filaments, yarns, cords, films, ribbons, tapes, and other shaped articles prepared from linear, segmented elastomeric polymers may be treated by the process of this invention. The treated fibers, filaments, and yarns may be used, either alone or in blends with natural or synthetic fibers, in the preparation of woven and non-woven fabrics, felts, batts, papers, and laminated structures. These are especially useful in the fabrication of foundation garments, bathing suits, and athletic gear. The invention can also be used in treating fibers, films, or fabrics coated with such elastomers.

This application is a continuation-in-part of my co-pending application, U.S. Serial No. 708,769, filed January 14, 1958, now abandoned.

It will be apparent that many widely different embodiments of this invention may be made without departing from the spirit and scope thereof, and therefore it is not intended to be limited except as indicated in the appended claims.

I claim:
1. The process of improving the tenacity, stress decay, and tensile recovery of an undrawn elastomeric shaped article having a substantially linear segmented polymeric structure which comprises heating said shaped article while substantially free of applied stretch at a temperature between 105° C. and 150° C. for a period of at least five minutes, said structure being comprised essentially of first and second segments alternating in the polymer chain, said first segment containing the residue after removal of terminal active hydrogen from a linear polymer melting below 50° C., having a molecular weight above about 600, and containing terminal radicals possessing active hydrogen, said second segment comprising at least one repeating unit of a linear crystalline polymer having a melting point above about 200° C. in its fiber-forming molecular weight range.

2. The process of claim 1 wherein said shaped article is in the form of a fiber.

3. The process of claim 1 wherein said temperature is between 110° C. and 130° C.

4. The process of claim 1 wherein said first segment is derived from a poly(alkylene oxide) glycol.

5. The process of claim 1 wherein said second segment is comprised of at least one repeating unit having the formula

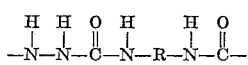

6. The process of claim 1 wherein said second segments comprise from about 10% to about 40% of the weight of said segmented polymeric structure.

7. The process of improving the tenacity, stress decay, and tensile recovery of an undrawn elastomeric shaped article having a substantially linear segmented polymeric structure which comprises heating said shaped article while substantially free of applied stretch at a temperature between 105° C. and 150° C. for a period of at least five minutes, said structure being comprised essentially of first and second segments alternating in the polymer chain, said first segments having the formula

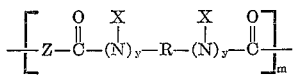

and said second segments having the formula

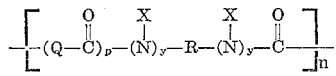

wherein Z is a bivalent radical which is inert to isocyanate groups at room temperature resulting from the removal of at least a part of each of the terminal functional groups of a linear polymer melting below 50° C., having a molecular weight above about 600, and containing terminal functional groups possessing active hydrogen, R is a bivalent radical, Q is a bivalent chain-extending radical, $m$ and $n$ are integers greater than 0, $p$ and $y$ are integers from 0 to 1 with the provision that when one is 0 the other is 1, X is a member of the class consisting of hydrogen and a monovalent organic radical, and the structure

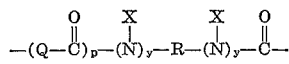

represents a repeating unit of a linear crystalline polymer having a melting point above about 200° C. in its fiber-forming molecular weight range.

8. The process of claim 7 wherein Q is

9. The process of claim 7 wherein Z is polyalkylene oxide.

10. The process of claim 7 wherein said shaped article is in the form of a fiber.

11. The process of claim 7 wherein said temperature is between 110° C. and 130° C.

12. The process of claim 7 wherein said second segments comprise from about 10% to about 40% by weight of said segmented polymeric structure.

References Cited in the file of this patent
UNITED STATES PATENTS

| | | |
|---|---|---|
| 2,205,449 | Wiley | June 25, 1940 |
| 2,239,780 | Fikentscher et al. | Apr. 29, 1941 |
| 2,389,655 | Wende | Nov. 27, 1945 |
| 2,445,042 | Sivlerman | July 13, 1948 |
| 2,514,088 | Pinsky | July 4, 1950 |
| 2,670,267 | Bredeson | Feb. 23, 1954 |
| 2,813,775 | Steuber | Nov. 19, 1957 |
| 2,813,776 | Koller | Nov. 19, 1957 |
| 2,957,852 | Frankenburg et al. | Oct. 25, 1960 |